US008862189B2

(12) United States Patent
Inagaki

(10) Patent No.: US 8,862,189 B2
(45) Date of Patent: Oct. 14, 2014

(54) PORTABLE ELECTRONIC DEVICE, SOUND OUTPUT METHOD, AND SOUND OUTPUT PROGRAM

(75) Inventor: Tomohiro Inagaki, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 171 days.

(21) Appl. No.: 13/597,654

(22) Filed: Aug. 29, 2012

(65) Prior Publication Data

US 2013/0053102 A1 Feb. 28, 2013

(30) Foreign Application Priority Data

Aug. 29, 2011 (JP) ................................ 2011-186517

(51) Int. Cl.
*H04M 1/00* (2006.01)
*H04R 3/12* (2006.01)

(52) U.S. Cl.
CPC ............ *H04R 3/12* (2013.01); *H04R 2205/041* (2013.01); *H04R 2430/01* (2013.01); *H04R 2420/03* (2013.01); *H04R 2499/11* (2013.01)
USPC ..................... 455/575.1; 455/90.3; 455/550.1

(58) Field of Classification Search
CPC ............ H04M 1/0214; H04M 1/6041; H04M 1/72519; H04M 1/0202; H04M 1/725
USPC .......................... 455/550.1, 575.1, 90.1, 90.3
See application file for complete search history.

(56) References Cited

U.S. PATENT DOCUMENTS 6,819,939 B2 * 11/2004 Masamura ................ 455/550.1
2008/0044036 A1 * 2/2008 Konchitsky .................. 381/71.1
2010/0311463 A1 * 12/2010 Konchitsky et al. ....... 455/550.1

FOREIGN PATENT DOCUMENTS

JP 2008-219586 A 9/2008

* cited by examiner

*Primary Examiner* — Nhan Le
(74) *Attorney, Agent, or Firm* — Hoffmann & Baron, LLP

(57) ABSTRACT

A mobile telephone device includes: a communication unit that communicates with external devices; a microphone that collects sound; a receiver that outputs sound; and a correcting unit that corrects quality of sound; in which the receiver outputs the sound collected by the microphone and corrected by the correcting unit. The mobile telephone device includes: a connector to which an earpiece can be connected; and a control unit that outputs the sound corrected by the correcting unit from the earpiece, when the earpiece is connected to the connector.

9 Claims, 9 Drawing Sheets

PORTABLE ELECTRONIC DEVICE, SOUND OUTPUT METHOD, AND SOUND OUTPUT PROGRAM

This application is based on and claims the benefit of priority from Japanese Patent Application No. 2011-186517, filed on 29 Aug. 2011, the content of which is incorporated herein by reference.

BACKGROUND OF THE INVENTION

1. Field of the Invention

The present invention relates to a portable electronic device with a sound collecting function, and to a sound output method and a sound output program.

2. Related Art

An increasing number of users with hearing loss are using mobile telephone devices. In this regard, Japanese Unexamined Patent Application, Publication No. 2008-219586, for example, discloses a mobile telephone device to which an earpiece can be connected, and in which sound is externally collected and is output from the earpiece. The mobile telephone device can aid the hearing loss of a user by outputting the sound, which is externally collected, from the earpiece.

SUMMARY OF THE INVENTION

When a user talks over a mobile telephone device by using an earpiece, the user hears his/her own voice differently from his/her ordinary voice. As a result, the user has difficulty in talking over the mobile telephone device after putting on the earpiece. However, the mobile telephone device disclosed in Japanese Unexamined Patent Application, Publication No. 2008-219586 cannot address such a problem, and cannot satisfactorily aid hearing.

An object of the present invention is to provide a portable electronic device, a sound output method, and a sound output program, all of which can satisfactorily aid hearing.

The portable electronic device according to the present invention is a portable electronic device including a communication unit that communicates with external devices, and the portable electronic device includes: a sound collecting unit that collects sound; an output unit that outputs sound; and a correcting unit that corrects quality of sound; in which the output unit outputs the sound collected by the sound collecting unit and corrected by the correcting unit.

It is preferable for the portable electronic device according to the present invention to further include: a connector to which an earpiece can be connected; and an output control unit that outputs the sound corrected by the correcting unit from the earpiece, when the earpiece is connected to the connector.

It is preferable for the portable electronic device according to the present invention to further include an operation unit, and it is preferable for the output control unit to switch an output destination from the output unit to the earpiece for outputting the sound thus corrected, based on an input from the operation unit.

In the portable electronic device according to the present invention, it is preferable for the output control unit to output the sound thus corrected from the output unit, when the earpiece is removed.

It is preferable for the portable electronic device according to the present invention to further include a changing unit that changes a correction parameter for correcting the quality of sound, when an output destination of the sound thus corrected is switched between the output unit and the earpiece.

In the portable electronic device according to the present invention, in a case in which the output control unit switches the output destination of the sound thus corrected from the earpiece to the output unit, when a correction level corresponding to the correction parameter exceeds a predetermined value, it is preferable for the changing unit to change the correction level to a predetermined level.

It is preferable for the portable electronic device according to the present invention to further include a receiving unit that receives an input of the correction parameter, and in a case in which a correction level corresponding to the correction parameter that is input from the receiving unit exceeds a predetermined value, it is preferable for the changing unit to change the correction parameter to a correction parameter corresponding to the predetermined level; and in a case in which a correction level corresponding to the correction parameter that is input from the receiving unit does not exceed the predetermined value, it is preferable for the changing unit to change the correction parameter to the correction parameter that is input from the receiving unit.

In the portable electronic device according to the present invention, it is preferable for a ringtone to be output from an output destination of the sound thus corrected, when there is a call incoming while outputting the sound thus corrected.

It is preferable for the portable electronic device according to the present invention to include: a first body; a second body in which the output unit is disposed; and a connecting portion that connects the first body and the second body so as to enable relative movement between a first form in which the output unit is covered with the first body, and a second form in which the output unit is opened, in which it is preferable for the output control unit to switch an output destination of the sound thus corrected from the output unit to the earpiece, when the second form is transformed into the first form.

It is preferable for the portable electronic device according to the present invention to include: a first body; a second body in which the output unit is disposed; and a connecting portion that connects the first body and the second body so as to enable relative movement between a first form in which the output unit is covered with the first body, and a second form in which the output unit is opened, and in a case in which an output destination of the sound thus corrected is the earpiece, it is preferable for the output control unit to continue outputting the sound thus corrected from the earpiece, regardless of the first form or the second form.

The sound output method according to the present invention is a sound output method for outputting sound by a portable electronic device including a communication unit that communicates with external devices, a sound collecting unit that collects sound, an output unit that outputs sound, and a correcting unit that corrects quality of sound, in which the method includes the steps of: correcting sound by the correcting unit; and outputting the sound corrected by the correcting unit from the output unit.

The sound output program according to the present invention is a sound output program for outputting sound by a portable electronic device including a communication unit that communicates with external devices, a sound collecting unit that collects sound, an output unit that outputs sound, and a correcting unit that corrects quality of sound, in which the program causes the portable electronic device to execute the steps of: correcting sound by the correcting unit; and outputting the sound corrected by the correcting unit from the output unit.

According to the present invention, it is possible to satisfactorily aid hearing.

DETAILED DESCRIPTION OF THE INVENTION

Descriptions are hereinafter provided for a mobile telephone device as a portable electronic device of the present invention.

Figure 1:
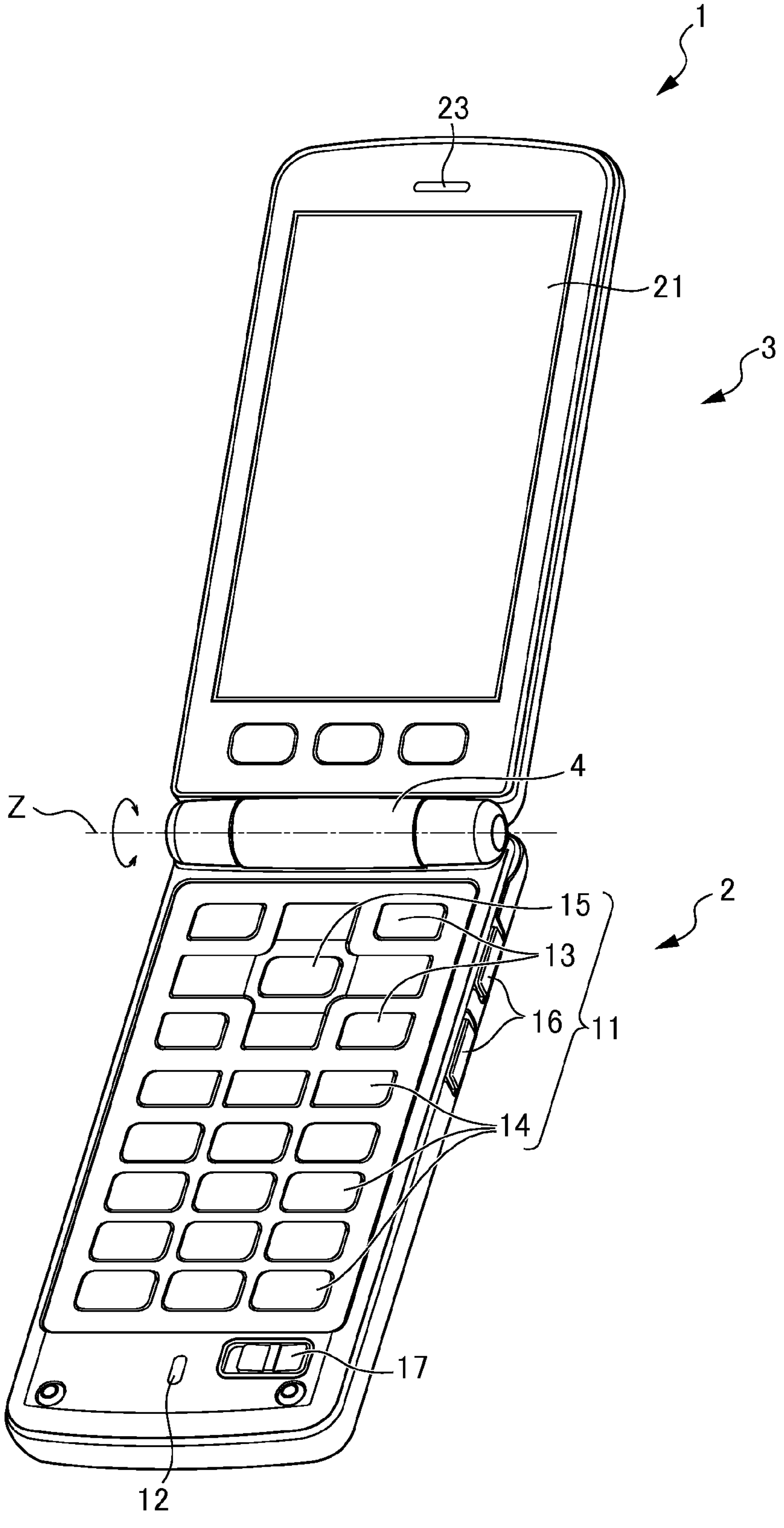
FIG. 1 is a perspective view showing an appearance of a mobile telephone device according to the present embodiment.

FIG. 1 is a perspective view showing an appearance of the mobile telephone device according to the present embodiment.

As shown in FIG. 1, the mobile telephone device 1 includes a first body 2 and a second body 3. The mobile telephone device 1 includes a connecting portion 4 that connects the first body 2 and the second body 3 so as to be openable and closable.

The mobile telephone device 1 is configured to be transformable between a closed state as a first form and an opened state as a second form.

In the closed state, the first body 2 and the second body 3 are disposed so as to be mutually superimposed. In the closed state of the present embodiment, the bodies are disposed such that main surfaces thereof face each other.

In the opened state, the bodies are disposed such that the main surface of the first body 2 and the main surface of the second body 3 are exposed. As shown in FIG. 1, in the opened state of the present embodiment, the main surface of the first body 2 and the main surface of the second body 3 are disposed to be separated from each other.

The first body 2 includes an operation unit 11, a microphone 12 as an input unit, a power supply operation unit 17, and various interfaces. The operation unit 11, the microphone 12 as the input unit, and the power supply operation unit 17 are disposed on the main surface of the first body 2.

The operation unit 11 includes function keys 13, character keys 14, an operation key 15, and side keys 16.

The function keys 13 are used for various settings and activation of various functions such as a telephone directory function or a mail function of the mobile telephone device 1. The character keys 14 are used for inputting characters such as numeric characters of a telephone number or non-numeric characters of mail. The operation key 15 is used for making determinations with regard to various operations or scrolling in upper, lower, left and right directions. The side keys 16 are used for various settings and activation of various functions such as the telephone directory function or the mail function of the mobile telephone device 1.

A function is assigned to each key composing the operation unit 11. The assignment of these functions is changed in accordance with the opened state or the closed state, various modes, or the type of an application running on the mobile telephone device 1. When any of the keys is depressed by a user, the mobile telephone device 1 operates in accordance with a function assigned to the key thus depressed.

The microphone 12 is at an end portion in a longitudinal direction of the first body 2. The microphone 12 is on a side opposite to the connecting portion 4. The microphone 12 is disposed at one end portion in the opened state of the mobile telephone device 1. The microphone 12 receives an input of sound uttered by the user, an input of environment sound around the mobile telephone device 1, or the like.

The power supply operation unit 17 is an operation unit for turning on or off a main power supply of the mobile telephone device 1.

The various interfaces include an interface for communicating with an external device (for example, a host device), and an interface for inserting and removing external memory. In the present embodiment, the mobile telephone device 1 includes a connector 33 (to be described later) as one of the various interfaces. The various interfaces are covered with caps when not in use.

The second body 3 includes a display unit 21 and a receiver 23 as output units. The display unit 21 and the receiver 23 are disposed on the main surface of the second body 3.

The display unit 21 is configured to be capable of displaying a variety of information such as character information or image information.

The receiver 23 is disposed on the main surface of the second body 3. The receiver 23 is disposed at the end portion in the longitudinal direction of the second body 3. The connecting portion 4 is on a side opposite to the receiver 23. The receiver 23 outputs sound of communication parties. The receiver 23 is covered with the first body 2 in the closed state, and is opened up in the opened state.

The connecting portion 4 includes an opening and closing hinge mechanism. The connecting portion 4 is disposed between the end portion of the first body 2 and the end portion of the second body 3. The connecting portion 4 connects the first body 2 and the second body 3 so as to enable relative movement. The connecting portion 4 of the present embodiment connects the first body 2 and the second body 3 so as to enable mutual rotation. The first body 2 and the second body 3 pivot around a rotation axis Z. The mobile telephone device 1 is transformed into the first form or the second form by pivoting around the rotation axis Z.

Descriptions are provided for a functional configuration of the mobile telephone device 1.

Figure 2:
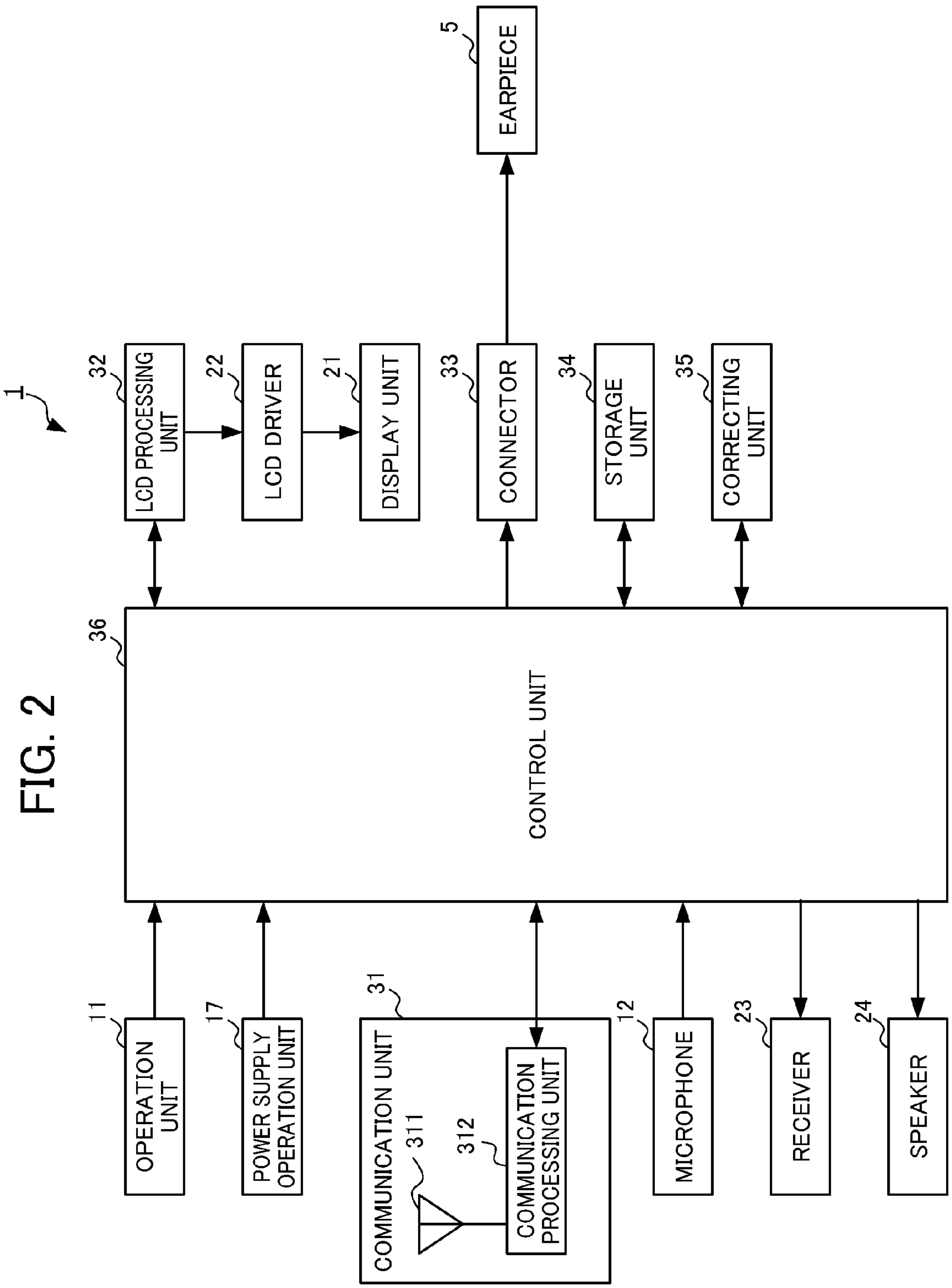
FIG. 2 is a block diagram showing a functional configuration of the mobile telephone device according to the present embodiment.

FIG. 2 is a block diagram showing the functional configuration of the mobile telephone device 1 according to the present embodiment.

As shown in FIG. 2, the mobile telephone device 1 includes the operation unit 11, the microphone 12, the power supply operation unit 17, the display unit 21, an LCD driver 22, the receiver 23, the speaker 24, a communication unit 31, an LCD processing unit 32, the connector 33, a storage unit 34, a correcting unit 35, and a control unit 36.

The speaker 24 outputs operational sound or ringtones of the mobile telephone device 1. The speaker 24 may be provided to the first body 2.

The communication unit 31 includes an antenna unit 311 and a communication processing unit 312.

The antenna unit 311 executes wireless communication with a base station through signals modulated in a predetermined frequency band (for example, an 800 MHz band). The antenna unit 311 transmits sound signals modulated by the communication processing unit 312 to the base station. The antenna unit 311 communicates with other communication devices through the base station.

The communication processing unit 312 modulates signals to be transmitted to the base station in a predetermined frequency band. The communication processing unit 312 demodulates signals received from the base station in a predetermined frequency band. The communication processing unit 312 outputs signals thus demodulated to the control unit 36.

The LCD processing unit 32 executes image processing. The LCD processing unit 32 outputs image data thus processed to the LCD driver 22. The LCD driver 22 includes frame memory. When the image data is transmitted from the LCD processing unit 32, the LCD driver 22 stores the image data into the memory. The LCD driver 22 outputs the image data stored in the memory to the display unit 21. In a case in which the control unit 36 executes the image processing, the mobile telephone device 1 need not include the LCD processing unit 32.

The connector 33 is an interface for outputting sound to an external device. As the external device, an earpiece 5 is connected to the connector 33.

The storage unit 34 stores a plurality of application programs. The storage unit 34 may be fixed inside the mobile telephone device 1, or may be removable.

The correcting unit 35 corrects quality of sound that is input.

Figure 3:
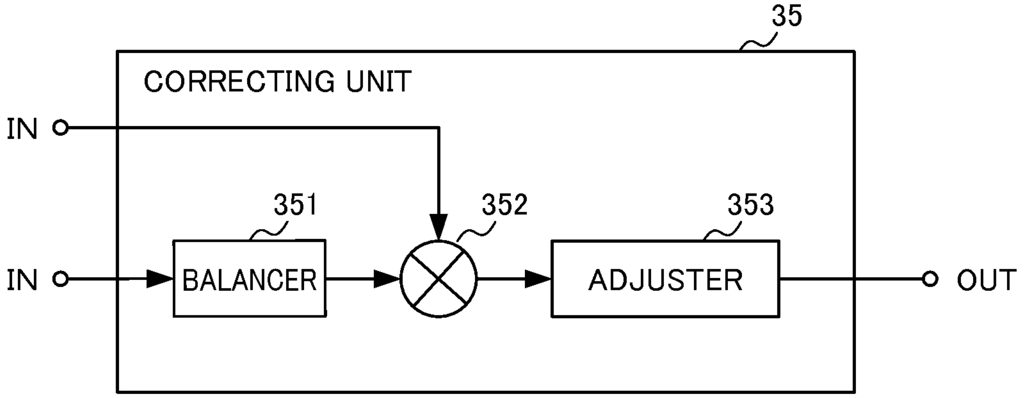
FIG. 3 is a block diagram showing functions of a correcting unit according to the present embodiment.

Descriptions are provided for detailed functions of the correcting unit 35 with reference to FIG. 3. FIG. 3 is a block diagram showing the functions of the correcting unit 35 according to the present embodiment. The correcting unit 35 includes a balancer 351, a mixer 352, and an adjuster 353.

By adjusting the volume of sound that is input from the microphone 12, the balancer 351 adjusts the balance between the volume of the sound that is input from the microphone 12, and the volume of the sound from the other party whom the user is talking with. The balancer 351 reduces or increases all frequency components of the sound that is input from the microphone 12. The balancer 351 can be omitted.

The mixer 352 mixes the sound that is input from the microphone 12 and the sound that is received by using the communication unit 31.

The adjuster 353 stores a correction table in which a correction parameter is associated with adjustment target characteristics. The control unit 36 selects a single correction parameter from the correction table. Based on adjustment target characteristics corresponding to the correction parameter thus selected, the adjuster 353 corrects the quality of the sound that is input. When the quality of the sound is corrected, the adjuster 353 outputs the sound to the control unit 36.

Figure 4:
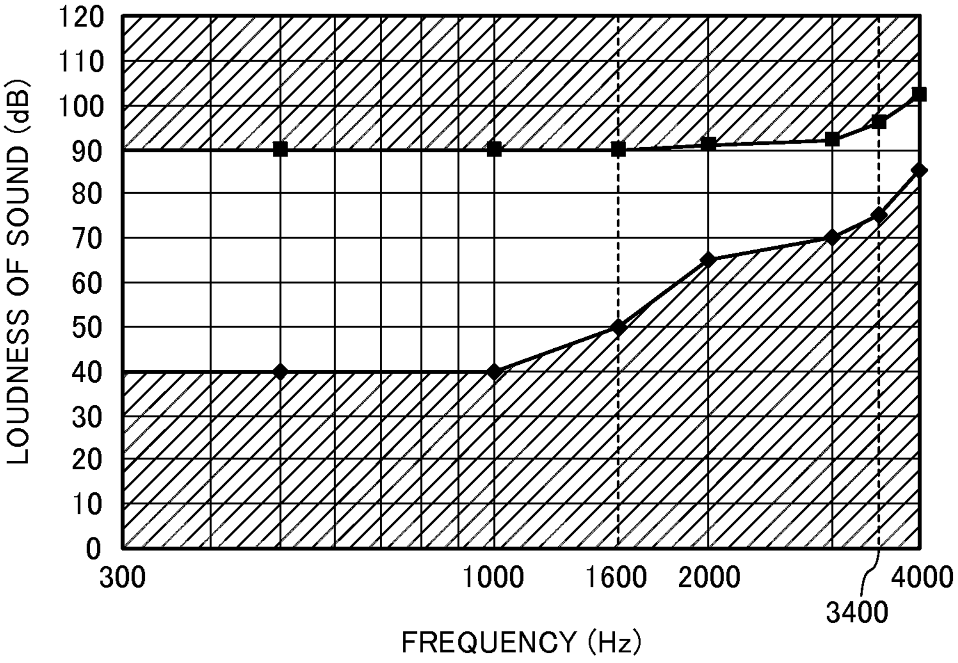
FIG. 4 is a conceptual diagram showing adjustment target characteristics for correcting quality of sound.

FIG. 4 is a conceptual diagram showing adjustment target characteristics for correcting quality of sound. The adjuster 353 adjusts the sound for each frequency, such that the loudness of the sound falls within a range between two polygonal lines shown in a graphic chart of FIG. 4. Herein, the correction parameter is set in a frequency band. For example, the adjuster 353 adjusts the volume of the sound at 1600 Hz to fall within a range of 50 dB (decibel) to 90 dB.

Figure 5:
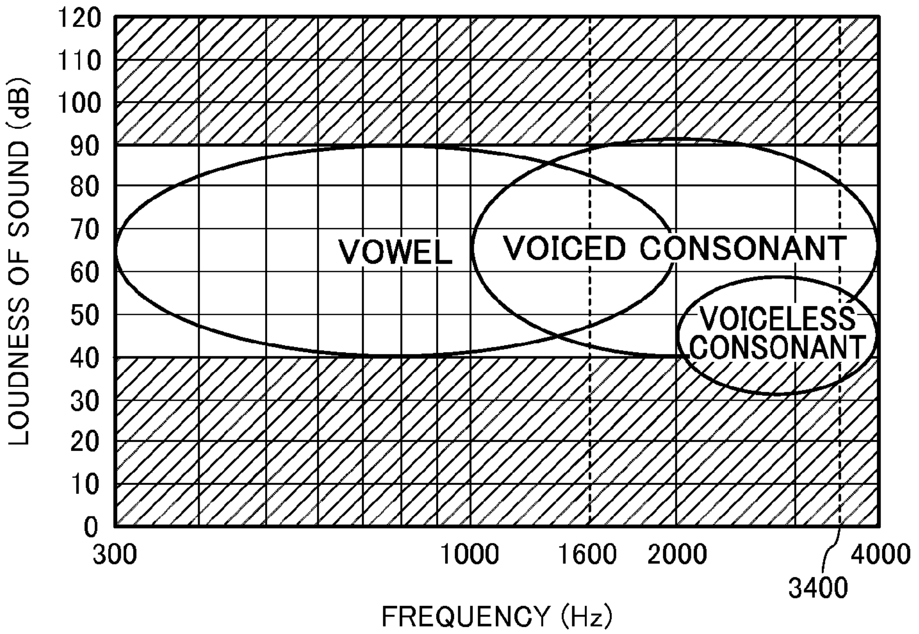
FIG. 5 is a diagram showing hearing acuity characteristics of a person without hearing loss.
Figure 6:
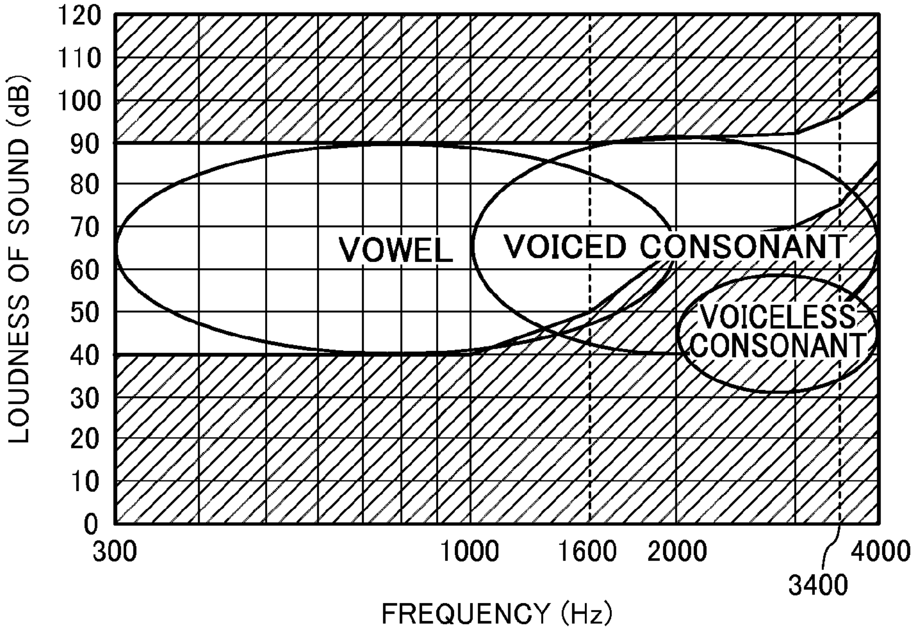
FIG. 6 is a diagram showing hearing acuity characteristics of a person with hearing loss.
Figure 7:
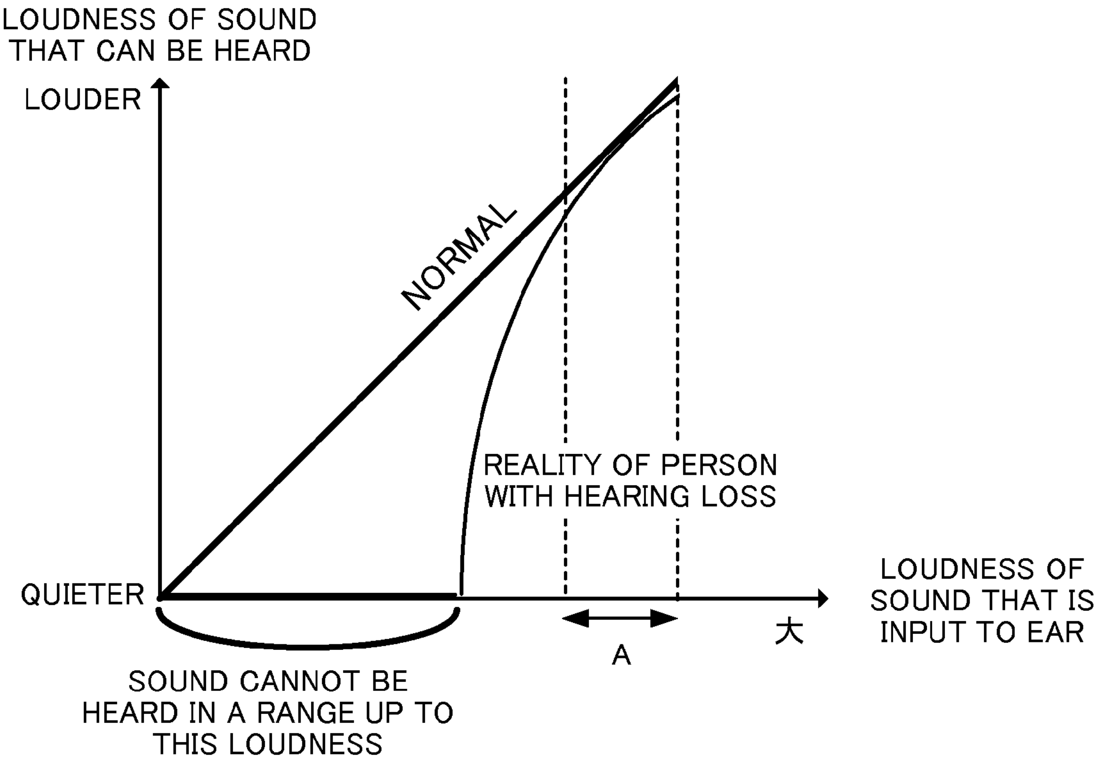
FIG. 7 is a diagram for comparing how sound is heard by a person without hearing loss, and how sound is heard by a person with hearing loss.

Descriptions are provided for a method of correcting quality of sound, in which the adjuster 353 executes the correction. FIG. 5 is a diagram showing hearing acuity characteristics of a person without hearing loss. FIG. 6 is a diagram showing hearing acuity characteristics of a person with hearing loss. FIG. 7 is a diagram for comparing how sound is heard by a person without hearing loss, and how sound is heard by a person with hearing loss.

As shown in FIG. 5, partitioning is performed to have an area of 90 dB and higher and an area of 40 dB and lower. As shown in FIG. 5, it is hard for a person without hearing loss to hear sound of 40 dB or lower. Sound of 90 dB or higher is generally felt to be too loud for a person without hearing loss. As shown in FIG. 6, when the loudness of sound that is satisfactorily heard by a person without hearing loss is compared with the loudness of sound that is satisfactorily heard by a person with hearing loss, the loudness is different between the two in a high frequency range. For example, at a frequency of 3000 Hz, it is hard for a person with hearing loss to hear sound of about 65 dB and lower. At a frequency of 4000 Hz, a person with hearing loss does not feel it too loud when hearing sound of about 100 dB.

FIGS. 5 and 6 show loudness of sound classified into vowels, voiced consonants, and voiceless consonants. As shown in FIGS. 5 and 6, vowels and voiced consonants generally fall within a range of 40 dB to 90 dB. Voiceless consonants generally fall within a range of 30 dB to 60 dB in a high frequency range. There is a tendency for voiceless consonants to be heard as being quieter than vowels and voiced consonants.

As shown in FIG. 5, in a frequency range of 300 Hz to 3400 Hz, a person without hearing loss can hear sound of 40 dB to 90 dB. As shown in FIG. 6, there is a tendency for it to be harder for a person with hearing loss to hear sound as the frequency becomes higher. There is a tendency for it to be hard for a person with hearing loss who can hear vowels to hear voiced consonants and voiceless consonants.

As shown in FIG. 7, a person with hearing loss can hardly hear sound that is quieter than a predetermined loudness. If the sound is louder than the predetermined loudness, a person with hearing loss can hear the sound in the same way as a person without hearing loss can. For example, a person with hearing loss can hear sound of loudness in a range A shown in FIG. 7 in the same way as a person without hearing loss can.

When sound at a frequency falls below the audible limit of sound pressure, the adjuster 353 executes gain adjustment to increase the loudness of the sound above the audible limit. As a result of such gain adjustment, it becomes easier for a person with hearing loss to hear voiced consonants and voiceless consonants. When sound at a frequency exceeds the limit of sound pressure that is felt too loud, the adjuster 353 executes gain adjustment to decrease the loudness of the sound below the limit. As a result of such gain adjustment, it becomes easier for a person with hearing loss to hear loud sound as well.

The mobile telephone device 1 may be configured to provide adjustment target characteristics for correcting quality of sound, in accordance with age. In response to receiving age via the operation unit 11, the correcting unit 35 corrects sound based on the adjustment target characteristics corresponding to the age.

In the mobile telephone device 1, adjustment target characteristics for correcting sound may be set in multiple stages in accordance with degrees of hearing loss. In a case of such a configuration, selection of adjustment target characteristics is received via the operation unit 11, and the correcting unit 35 corrects sound based on the adjustment target characteristics thus selected.

The control unit 36 controls the entirety of the mobile telephone device 1.

The control unit 36 includes, for example, a CPU (Central Processing Unit). The control unit 36 may include a plurality of microprocessors.

This control unit 36 has a sound collecting function, and works as an output control unit, a changing unit and a receiving unit.

The control unit 36 monitors voltage change in a terminal of the connector 33. Based on voltage change, the control unit 36 detects that the earpiece 5 is connected to the connector 33. Based on voltage change, the control unit 36 detects that the connection earpiece 5 is removed from the connector 33.

When sound is input from the microphone 12, the control unit 36 outputs the sound to the communication processing unit 312. The control unit 36 may have a function of delaying the entire frequency of the sound that is input from the microphone 12. With the mobile telephone device 1 having this function, the other party, whom the user is talking with, hears the user as if the user is talking slowly. In this case, the control unit 36 outputs the sound thus corrected to the communication processing unit 312.

When sound is input from the microphone 12, the control unit 36 outputs the sound to the correcting unit 35. When the sound is corrected by the correcting unit 35, the control unit 36 outputs the sound thus corrected from the receiver 23.

When the earpiece 5 is connected to the connector 33, the control unit 36 outputs the sound corrected by the correcting unit 35 from the earpiece 5. For example, when the mobile telephone device 1 detects that the earpiece 5 is connected to the connector 33, the output destination is switched from the receiver 23 to the earpiece 5. In this case, the control unit 36 detects that the earpiece 5 is connected to the connector 33, based on voltage change. For example, the control unit 36 may output the sound corrected by the correcting unit 35 from both the earpiece 5 and the receiver 23.

When the earpiece 5 is removed from the connector 33, the control unit 36 outputs the sound corrected by the correcting unit 35 from the receiver 23.

In a case in which the earpiece 5 is connected to the connector 33, the control unit 36 switches the output destination of the corrected sound from the receiver 23 to the earpiece 5, based on an operational input from the operation unit 11. The control unit 36 outputs the corrected sound from the earpiece 5.

When the mobile telephone device 1 is transformed from the opened state into the closed state, the control unit 36 switches the output destination of the corrected sound from the receiver 23 to the earpiece 5. For example, the control unit 36 detects whether the first body 2 and the second body 3 are in the opened state or in the closed state. In a case in which the earpiece 5 is connected to the connector 33, and the output destination of the corrected sound is the receiver 23, when the closed state is detected, the control unit 36 switches the output destination of the corrected sound from the receiver 23 to the earpiece 5. In a case in which the earpiece 5 is not connected, the control unit 36 may stop the outputting.

In a case in which the output destination of the corrected sound is the earpiece 5, the control unit 36 continues outputting the corrected sound from the earpiece 5, regardless of the closed state or the opened state.

When the output destination of the corrected sound is switched between the receiver 23 and the earpiece 5, the control unit 36 changes the correction parameter for correcting quality of sound. In a case in which the output destination of the corrected sound is switched to the earpiece 5, the control unit 36 switches the correction parameter to a first correction parameter. The first correction parameter is a correction parameter to be used in a case in which the earpiece 5 is connected. In a case in which the output destination of the corrected sound is switched to the receiver 23, the control unit 36 switches the correction parameter to a second correction parameter. The second correction parameter is a correction parameter to be used in a case in which the receiver 23 is used.

When a correction level corresponding to the correction parameter exceeds a predetermined value, the control unit 36 changes the correction level to a predetermined level. For example, in a case in which the output destination of the corrected sound is switched from the earpiece 5 to the receiver 23, the control unit 36 determines whether the highest correction level in the adjustment target characteristics corresponding to the correction parameter to be used for the correction exceeds a predetermined value. In a case in which the correction level exceeds the predetermined value, the control unit 36 changes the correction parameter to a predetermined correction parameter. The predetermined correction parameter corresponds to predetermined adjustment target characteristics. The highest correction level in the predetermined adjustment target characteristics is referred to as a predetermined level. As a result, the highest correction level in the adjustment target characteristics corresponding to the correction parameter is changed to a predetermined level.

The predetermined value corresponds to a sound pressure of a level at which sound that is output from the receiver 23 is not easily re-corrected by the correcting unit 35.

The control unit 36 receives input of a correction parameter via the operation unit 11. In a case in which a correction level corresponding to the correction parameter thus input exceeds a predetermined value, the control unit 36 changes the correction parameter to a correction parameter corresponding to the predetermined level. In a case in which a correction level corresponding to the correction parameter thus input does not exceed the predetermined value, the control unit 36 changes the correction parameter to the correction parameter thus input.

For example, the control unit 36 determines whether the highest correction level in the adjustment target characteristics corresponding to the correction parameter thus input exceeds a predetermined value. In a case in which the highest correction level exceeds the predetermined value, the control unit 36 changes the correction parameter to a predetermined correction parameter. In a case in which the highest correction level does not exceed the predetermined value, the control unit 36 changes the correction parameter to the correction parameter thus input. In a case in which the output destination of the corrected sound is the earpiece 5, the predetermined correction parameter is the first correction parameter. In a case in which the output destination of the corrected sound is the receiver 23, the predetermined correction parameter is the second correction parameter.

In a case in which the control unit 36 determines that the highest correction level exceeds the predetermined value, the control unit 36 causes the display unit 21 to display that the correction level corresponding to the correction parameter exceeds an upper limit.

When there is a call incoming while outputting the sound corrected by the correcting unit 35, the control unit 36 outputs a ringtone from the output destination of the corrected sound.

In a case in which there is a call incoming while outputting sound from the earpiece 5, the control unit 36 outputs the ringtone from the earpiece 5. On the other hand, in a case in which there is a call incoming while outputting sound from the receiver 23, the control unit 36 outputs the ringtone from the receiver 23.

In a case in which the output destination of the corrected sound is the receiver 23, the control unit 36 may output the ringtone from the speaker 24.

Next, descriptions are provided for a flow of processing in a case in which the sound collecting function is operating in the mobile telephone device 1.

Figure 8:
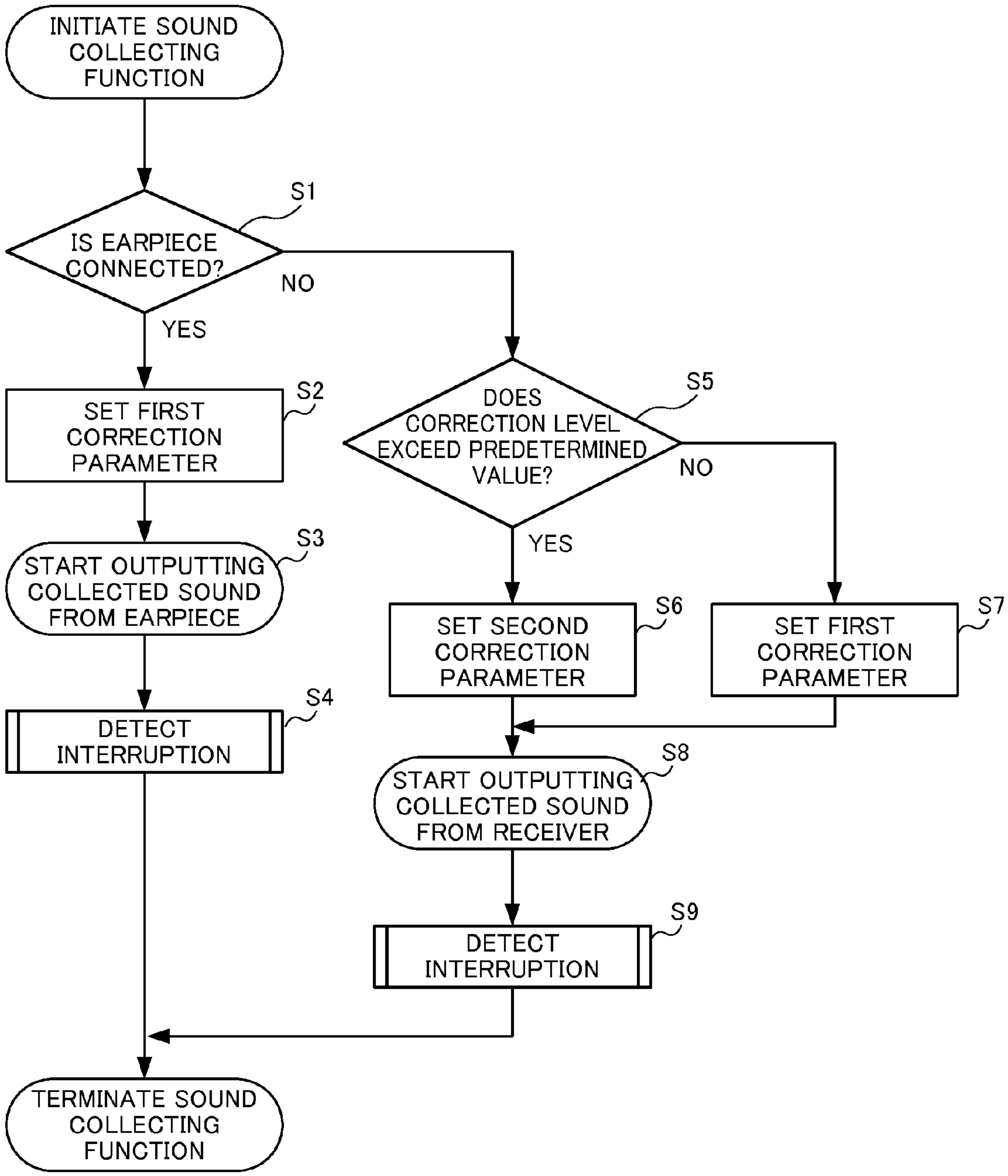
FIG. 8 is a flowchart showing a flow of processing in a case in which a sound collecting function is initiated in the mobile telephone device according to the present embodiment.

FIG. 8 is a flowchart showing a flow of processing in a case in which the sound collecting function is initiated in the mobile telephone device 1 according to the present embodiment. The sound collecting function is initiated in response to an operation of initiating the sound collecting function via the operation unit 11.

In Step S1, the control unit 36 determines whether it is detected that the earpiece 5 is connected to the connector 33. In a case in which the determination is YES, the control unit 36 advances the processing to Step S2, and in a case in which the determination is NO, the control unit 36 advances the processing to Step S5.

In Step S2, the control unit 36 sets the first correction parameter as a correction parameter to be referred to by the correcting unit 35.

In Step S3, the control unit 36 starts outputting the sound collected by microphone 12 from the earpiece 5. Based on the adjustment target characteristics corresponding to the first correction parameter, the correcting unit 35 corrects the sound collected by the microphone 12. The control unit 36 outputs the corrected sound from the earpiece 5. The control unit 36 terminates the sound collecting function in response to an operation of terminating the sound collecting function via the operation unit 11.

In Step S4, when interruption of the processing is detected, the control unit 36 executes any of interruption processing shown in FIGS. 9 to 12. Examples of the interruption processing include, for example, earpiece attachment/detachment detection processing, acoustic gain adjustment request processing, closed state detection processing, and opened state detection processing. The control unit 36 terminates the sound collecting function in response to an operation of terminating the sound collecting function via the operation unit 11.

In Step S5, the control unit 36 determines whether the highest correction level in the adjustment target characteristics corresponding to the correction parameter to be used for correction exceeds a predetermined value. In a case in which the determination is YES, the control unit 36 advances the processing to Step S6, and in a case in which the determination is NO, the control unit 36 advances the processing to Step S7.

In Step S6, the control unit 36 sets the second correction parameter as a correction parameter to be referred to by the correcting unit 35.

In Step S7, the control unit 36 sets the first correction parameter as a correction parameter to be referred to by the correcting unit 35.

In Step S8, the control unit 36 starts outputting the sound collected by microphone 12 from the receiver 23.

Based on the first or second correction parameter, the correcting unit 35 corrects the sound collected by the microphone 12. The control unit 36 outputs the corrected sound from the receiver 23.

In Step S9, when interruption of the processing is detected, the control unit 36 executes any of the interruption processing shown in FIGS. 9 to 12. The control unit 36 terminates the sound collecting function in response to an operation of terminating the sound collecting function via the operation unit 11.

Figure 9:
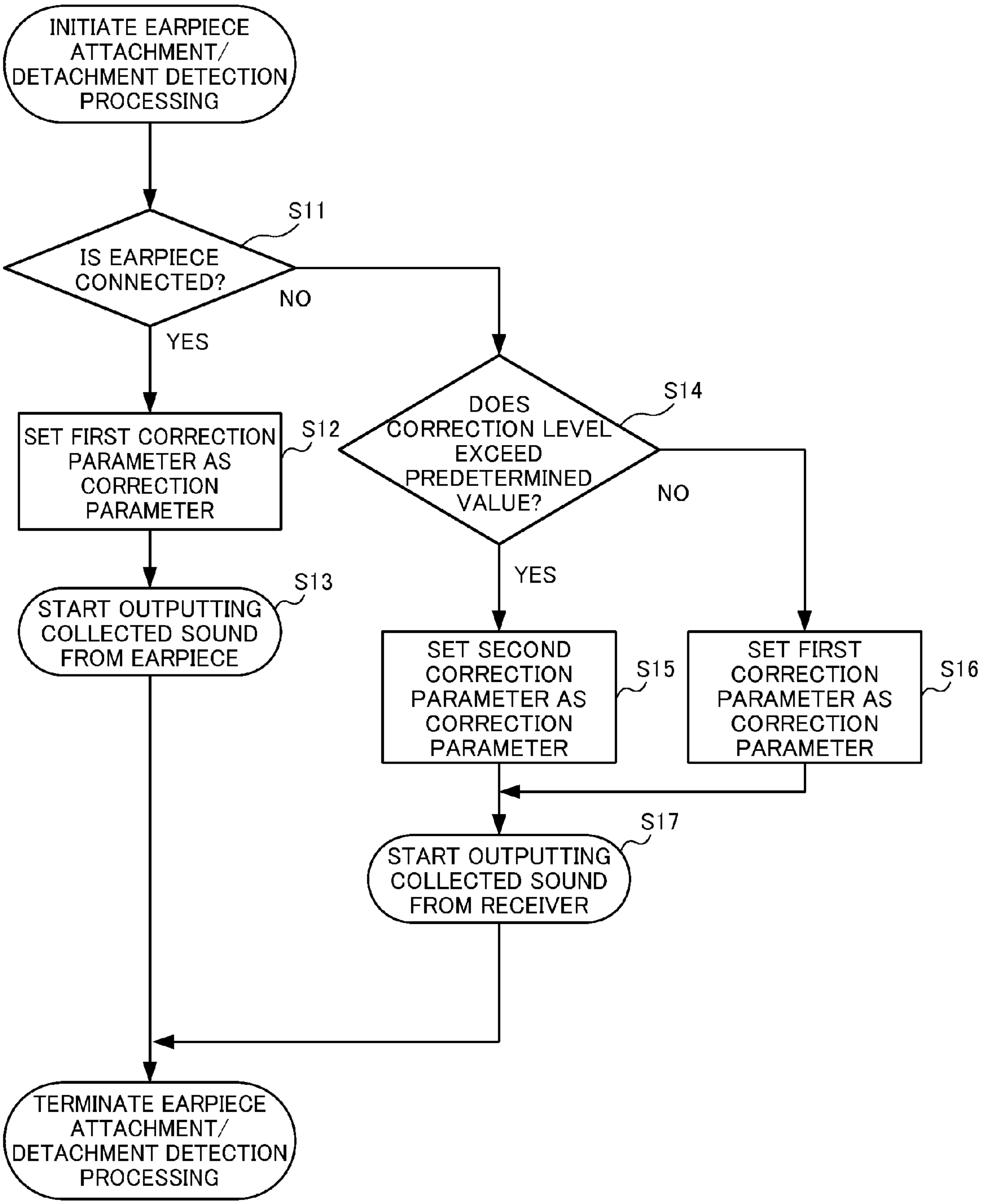
FIG. 9 is a flowchart showing a flow of earpiece attachment/detachment detection processing, as interruption processing in a case in which the sound collecting function is operating in the mobile telephone device according to the present embodiment.

FIG. 9 is a flowchart showing a flow of the earpiece attachment/detachment detection processing, as interruption processing in a case in which the sound collecting function is being operated in the mobile telephone device 1 according to the present embodiment. The earpiece attachment/detachment detection processing is initiated in response to detecting that the earpiece 5 is connected to the connector 33, or detecting that the connection is removed from the earpiece 5 from the connector 33.

In Step S11, the control unit 36 determines whether the earpiece 5 is connected to the connector 33. In a case in which the determination is YES, the control unit 36 advances the processing to Step S12, and in a case in which the determination is NO, the control unit 36 advances the processing to Step S14.

In Step S12, the control unit 36 sets the first correction parameter as a correction parameter to be referred to by the correcting unit 35.

In Step S13, the control unit 36 starts outputting the sound collected by microphone 12 from the earpiece 5. Based on the first correction parameter, the correcting unit 35 corrects the sound collected by the microphone 12. The control unit 36 outputs the corrected sound from the earpiece 5. Subsequently, the control unit 36 terminates the earpiece attachment/detachment detection processing.

In Step S14, the control unit 36 determines whether the highest correction level in the adjustment target characteristics corresponding to the correction parameter to be used for correction exceeds a predetermined value. In a case in which the determination is YES, the control unit 36 advances the processing to Step S15, and in a case in which the determination is NO, the control unit 36 advances the processing to Step S16.

In Step S15, the control unit 36 sets the second correction parameter as a correction parameter to be referred to by the correcting unit 35.

In Step S16, the control unit 36 sets the first correction parameter as a correction parameter to be referred to by the correcting unit 35.

In Step S17, the control unit 36 starts outputting the sound collected by the microphone 12 from the receiver 23. Based on the first or second correction parameter, the correcting unit 35 corrects the sound collected by the microphone 12. The corrected sound is output from the receiver 23. Subsequently, the control unit 36 terminates the earpiece attachment/detachment detection processing.

Figure 10:
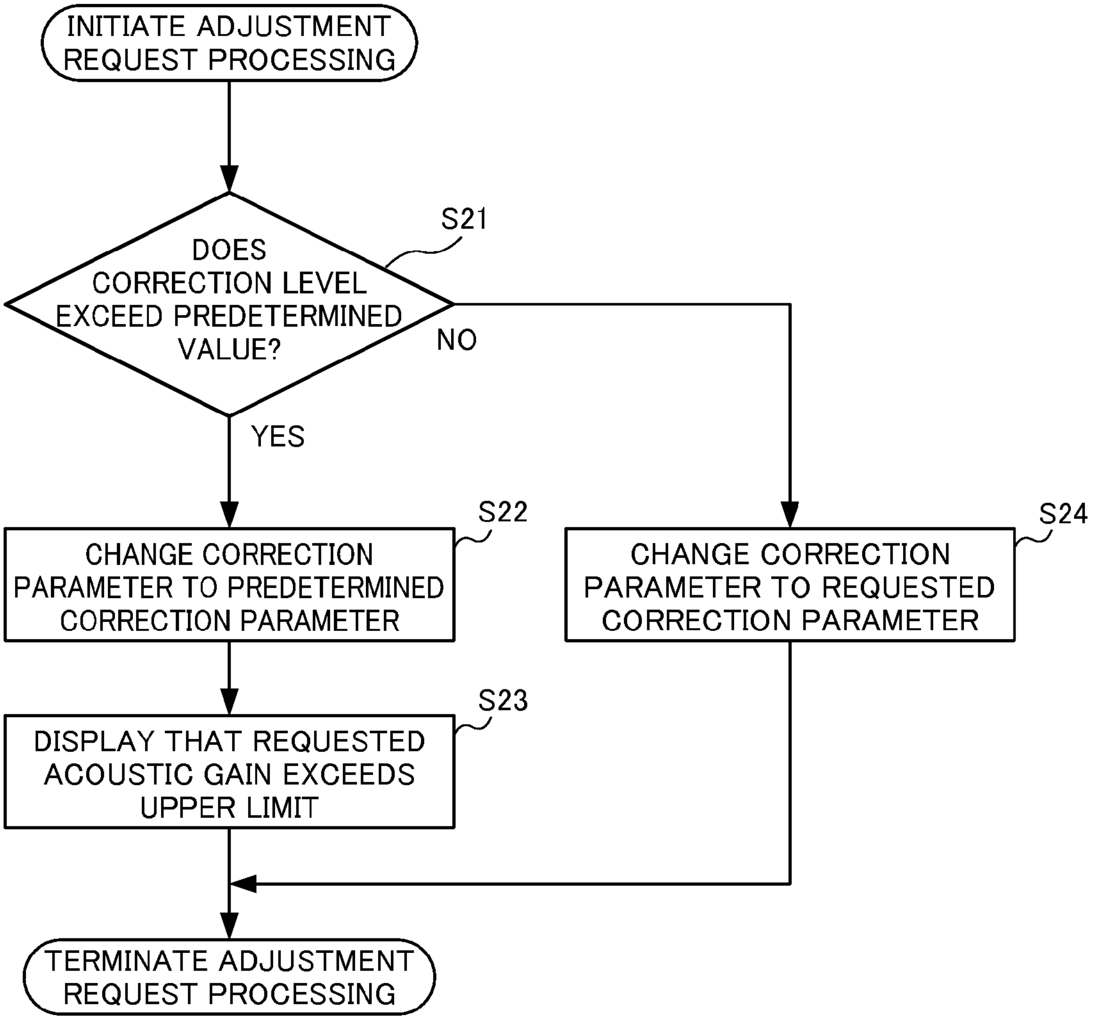
FIG. 10 is a flowchart showing a flow of adjustment request processing, as interruption processing in a case in which the sound collecting function is operating in the mobile telephone device according to the present embodiment.

FIG. 10 is a flowchart showing a flow of the adjustment request processing, as interruption processing in a case in which the sound collecting function is being operated in the mobile telephone device 1 according to the present embodiment. The adjustment request processing is initiated in response to a request for adjusting a correction parameter having being made in the control unit 36.

In Step S21, the control unit 36 determines whether the highest correction level in the adjustment target characteristics corresponding to the requested correction parameter exceeds a predetermined value. In a case in which the determination is YES, the control unit 36 advances the processing to Step S22, and in a case in which the determination is NO, the control unit 36 advances the processing to Step S24.

In Step S22, the control unit 36 sets a predetermined correction parameter as the correction parameter to be referred to by the correcting unit 35. In a case in which the output destination of the corrected sound is the earpiece 5, the predetermined correction parameter is the first correction parameter. In a case in which the output destination of the corrected sound is the receiver 23, the predetermined correction parameter is the second correction parameter.

In Step S23, the control unit 36 causes the display unit 21 to display that the requested acoustic gain exceeds the upper limit. Subsequently, the control unit 36 terminates the adjustment request processing.

In Step S24, the control unit 36 changes the correction parameter, which is referred to by the correcting unit 35, to the requested correction parameter. Subsequently, the control unit 36 terminates the adjustment request processing.

Figure 11:
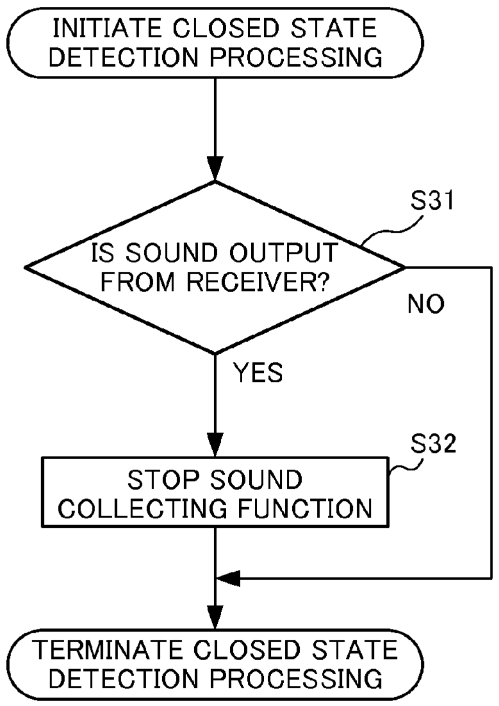
FIG. 11 is a flowchart showing a flow of closed state detection processing, as interruption processing in a case in which the sound collecting function is operating in the mobile telephone device according to the present embodiment.

FIG. 11 is a flowchart showing a flow of interruption processing, in a case in which the sound collecting function is being operated in the mobile telephone device 1 according to the present embodiment. This interruption processing is initiated in response to detecting change from the opened state to the closed state. This interruption processing is described as the closed state detection processing.

In Step S31, the control unit 36 determines whether the sound that is input from the microphone 12 is being output from the receiver 23. In a case in which the determination is YES, the control unit 36 advances the processing to Step S32, and in a case in which the determination is NO, the control unit 36 terminates the closed state detection processing.

In Step S32, the control unit 36 stops the sound collecting function. Subsequently, the control unit 36 terminates the closed state detection processing.

In a case in which the determination in Step S31 is NO, the corrected sound is being output from the earpiece 5. In this condition, the control unit 36 does not execute processing of terminating the sound collecting function, even if the closed state is detected.

Figure 12:
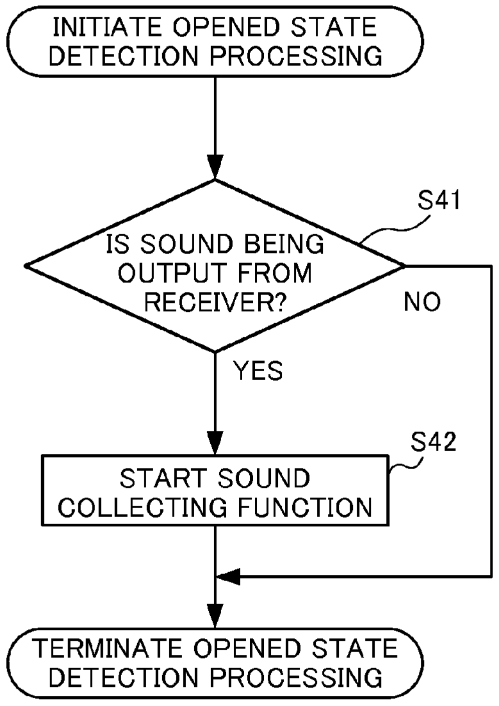
FIG. 12 is a flowchart showing a flow of opened state detection processing, as interruption processing in a case in which the sound collecting function is operating in the mobile telephone device according to the present embodiment.

FIG. 12 is a flowchart showing a flow of interruption processing, in a case in which the sound collecting function is operating in the mobile telephone device 1 according to the present embodiment. This interruption processing is initiated in response to detecting change from the closed state to the opened state. This interruption processing is described as the opened state detection processing.

In Step S41, the control unit 36 determines whether the sound that is input from the microphone 12 is being output from the receiver 23. In a case in which the determination is YES, the control unit 36 advances the processing to Step S42, and in a case in which the determination is NO, the control unit 36 terminates the opened state detection processing.

In Step S42, the control unit 36 initiates the sound collecting function, and starts outputting sound from the receiver 23. Subsequently, the control unit 36 terminates the opened state detection processing.

In a case in which the determination in Step S41 is NO, the mobile telephone device 1 is in a state in which the sound is output from the earpiece 5. In other words, in a state where the sound is output from the earpiece 5, the control unit 36 does not execute processing of terminating the sound collecting function, even if the closed state is detected.

According to the mobile telephone device 1 of the present embodiment, the following effects are achieved.

The receiver 23 outputs the sound collected by the microphone 12 and corrected by the correcting unit 35. Since the corrected sound is output from the receiver 23, the mobile telephone device 1 can satisfactorily aid the hearing of the user.

When the earpiece 5 is connected to the connector 33, the control unit 36 outputs the sound corrected by the correcting unit 35 from the earpiece 5. In a case in which the earpiece 5 is connected to the connector 33, the mobile telephone device 1 can aid the hearing of the user through the earpiece 5.

Based on an operation of the operation unit 11, the control unit 36 switches the output destination from the receiver 23 to the earpiece 5 for outputting the corrected sound. The mobile telephone device 1 can switch the output destination, based on an operation by the user. The output destination may be switched, based on a preset operation desired by the user.

When the earpiece 5 is removed, the control unit 36 outputs the corrected sound from the receiver 23. The mobile telephone device 1 can automatically output the corrected sound from the receiver 23 in response to the removing of the earpiece 5.

When the output destination of the corrected sound is switched between the receiver 23 and the earpiece 5, the control unit 36 changes the correction parameter for correcting quality of sound. The mobile telephone device 1 can change the correction parameter to an appropriate correction parameter, in response to the switching of the output destination of the corrected sound.

In a case in which the output destination of the corrected sound is switched from the earpiece 5 to the receiver 23, when the correction level corresponding to the correction parameter exceeds a predetermined value, the control unit 36 changes the correction level to a predetermined level. When the correction level exceeds the predetermined value, acoustic feedback occurs due to loud sound being input from the receiver 23 into the microphone 12. In a case in which the correction level exceeds the predetermined value, the mobile telephone device 1 changes the correction level to a predetermined level; therefore, the occurrence of such acoustic feedback can be reduced.

In a case in which the correction level corresponding to the input parameter exceeds the predetermined value, the control unit 36 changes the correction parameter to a parameter corresponding to the predetermined level. In a case in which the correction level corresponding to the input correction parameter does not exceed the predetermined value, the control unit 36 changes the correction parameter to the input parameter. The mobile telephone device 1 can reduce the occurrence of acoustic feedback resulting from a high correction level corresponding to the input parameter.

When there is a call incoming while outputting the corrected sound from the earpiece 5, the control unit 36 outputs a ringtone from the earpiece 5. When there is a call incoming while outputting the corrected sound from the receiver 23, the control unit 36 outputs the ringtone from the receiver 23. Since the mobile telephone device 1 outputs a ringtone from the output destination of the corrected sound, it is easy to notify the user that there is a call incoming.

In a case in which the output destination of the corrected sound is the earpiece 5, the control unit 36 continues outputting the corrected sound from the earpiece 5, regardless of the closed state or the opened state. The mobile telephone device 1 can continue to aid hearing through the earpiece 5, regardless of the closed state or the opened state.

In a case in which the output destination of the corrected sound is the receiver 23, when the closed state is detected, the control unit 36 switches the output destination to the earpiece 5. In a case in which the output destination of the corrected sound is the receiver 23, when the opened state is changed to the closed state, acoustic feedback is likely to occur due to proximity of the receiver 23 and the microphone 12. In this case, the mobile telephone device 1 can reduce acoustic feedback by stopping the outputting of the sound from the receiver 23. When the closed state is detected while the earpiece 5 is connected, the mobile telephone device 1 can automatically switch to the earpiece 5 to aid hearing. When the closed state is detected while the earpiece 5 is connected, the mobile telephone device 1 may stop the outputting from the receiver 23, and may stop the inputting from the microphone 12.

A preferable embodiment has been described above, but the present invention is not limited to the aforementioned embodiment and can be implemented as various types of embodiments. For example, the abovementioned embodiment has described the mobile telephone device 1 as a portable electronic device, but it is not limited thereto. For example, the portable electronic device may be a PHS (registered trademark: Personal Handyphone System).

In the present embodiment, the configuration of the mobile telephone device of a so-called folder type has been described, but it is not limited thereto. The mobile telephone device according to the present invention may be of a type in which the first body 2 and the second body 3 are disposed in one body without a connecting portion (straight type). The mobile telephone device according to the present invention may be of a slider type, in which one of the first body 2 and the second body 3 slides in one direction in a state where the bodies are mutually superimposed. The mobile telephone device according to the present invention may be of a rotating type, in which one of the first body 2 and the second body 3 is rotated around an axis line along the direction of superimposing the bodies.

In the present embodiment, the correcting unit 35 corrects quality of sound after mixing the sound, but it is not limited thereto. The correcting unit according to the present invention may be configured to include a first adjuster, a second adjuster, and the mixer. In such a configuration, the first adjuster corrects sound that is input from the microphone 12. The second adjuster corrects sound that is received by using the communication unit 31. The mixer mixes the sound corrected by the first adjuster and the sound corrected by the second adjuster. This mixer outputs the sound thus mixed to the control unit 36.

In the present embodiment, in a case in which the output destination of the corrected sound is switched from the earpiece 5 to the receiver 23, a determination is made as to whether the highest correction level in the adjustment target characteristics corresponding to the correction parameter to be used for the correction exceeds a predetermined value, but it is not limited thereto. The mobile telephone device according to the present invention may be configured to express a correction parameter as a value corresponding to a correction level. In such a configuration, the control unit adjusts the correction level, based on the value represented by the correction parameter.

The correction parameter may be separately provided as a parameter to be used for sound from the microphone 12, and a parameter to be used for sound from the other party whom the user is talking with. The mobile telephone device using separate parameters can correct sound in accordance with properties depending on the devices.

The mobile telephone device according to the present invention may be configured to include a measuring unit that measures sound pressure of corrected sound. In such a configuration, the control unit adjusts the correction level based on the sound measured by the measuring unit.

In the mobile telephone device according to the present invention, each functional unit provided to the first body 2 or the second body 3 may be provided to at least one of the first body 2 or the second body 3.

The present invention includes a sound output method for outputting sound by a portable electronic device including a communication unit that communicates with external devices, a sound collecting unit that collects sound, an output unit that outputs sound, a storage unit that stores a predetermined acoustic gain, and a correcting unit that corrects quality of sound, in which the method includes the steps of: correcting sound by the correcting unit, based on the predetermined acoustic gain stored in the storage unit; and outputting the sound corrected by the correcting unit from the output unit.

The present invention includes a sound output program for outputting sound by a portable electronic device including a communication unit that communicates with external devices, a sound collecting unit that collects sound, an output unit that outputs sound, a storage unit that stores a predetermined acoustic gain, and a correcting unit that corrects quality of sound, in which the program causes the portable electronic device to execute the steps of: correcting sound by the correcting unit, based on the predetermined acoustic gain stored in the storage unit; and outputting the sound corrected by the correcting unit from the output unit.

What is claimed is:

1. A portable electronic device including a communication unit that communicates with external devices, the portable electronic device comprising:

a sound collecting unit that collects sound;

an output unit that outputs sound;

a correcting unit that corrects quality of sound, wherein the output unit outputs the sound collected by the sound collecting unit and corrected by the correcting unit;

a connector to which an earpiece can be connected;

an output control unit that outputs the sound corrected by the correcting unit from the earpiece, when the earpiece is connected to the connector; and a changing unit that changes a correction parameter for correcting the quality of sound, when an output destination of the sound thus corrected is switched between the output unit and the earpiece, wherein, in a case in which the output control unit switches the output destination of the sound thus corrected from the earpiece to the output unit, when a correction level corresponding to the correction parameter exceeds a predetermined value, the changing unit changes the correction level to a predetermined level.

2. The portable electronic device according to claim 1, further comprising:

an operation unit, wherein the output control unit switches an output destination from the output unit to the earpiece to output the sound thus corrected, based on an input from the operation unit.

3. The portable electronic device according to claim 1, wherein the output control unit outputs the sound thus corrected from the output unit, when the earpiece is removed.

4. The portable electronic device according to claim 1, further comprising:

a receiving unit that receives an input of the correction parameter, wherein, in a case in which a correction level corresponding to the correction parameter that is input from the receiving unit exceeds a predetermined value, the changing unit changes the correction parameter to a correction parameter corresponding to the predetermined level, and wherein, in a case in which a correction level corresponding to the correction parameter that is input from the receiving unit does not exceed the predetermined value, the changing unit changes the correction parameter to the correction parameter that is input from the receiving unit.

5. The portable electronic device according to claim 1, wherein a ringtone is output from an output destination of the sound thus corrected, when there is a call incoming while outputting the sound thus corrected.

6. The portable electronic device according to claim 1, further comprising:

a first body;

a second body in which the output unit is disposed; and a connecting portion that connects the first body and the second body so as to enable relative movement between a first form in which the output unit is covered with the first body, and a second form in which the output unit is opened;

wherein the output control unit switches an output destination of the sound thus corrected from the output unit to the earpiece, when the second form is transformed into the first form.

7. The portable electronic device according to claim 1, further comprising:

a first body;

a second body in which the output unit is disposed; and a connecting portion that connects the first body and the second body so as to enable relative movement between a first form in which the output unit is covered with the first body, and a second form in which the output unit is opened;

wherein, in a case in which an output destination of the sound thus corrected is the earpiece, the output control unit continues outputting the sound thus corrected from the earpiece, regardless of the first form or the second form.

8. A sound output method for outputting sound by a portable electronic device including a communication unit that communicates with external devices, a sound collecting unit that collects sound, an output unit that outputs sound, and a correcting unit that corrects quality of sound, the method comprising the steps of:

correcting sound by the correcting unit;

outputting the sound corrected by the correcting unit from the output unit;

connecting an earpiece to a connector;

outputting the sound corrected by the correcting unit from the earpiece, when the earpiece is connected to the connector; and changing a correction parameter for correcting the quality of sound, when an output destination of the sound thus corrected is switched between the output unit and the earpiece, wherein, in a case in which the output control unit switches the output destination of the sound thus corrected from the earpiece to the output unit, when a correction level corresponding to the correction parameter exceeds a predetermined value, the changing unit changes the correction level to a predetermined level.

9. A sound output program for outputting sound by a portable electronic device including a communication unit that communicates with external devices, a sound collecting unit that collects sound, an output unit that outputs sound, and a correcting unit that corrects quality of sound, the program causing the portable electronic device to execute the steps of:

correcting sound by the correcting unit;

outputting the sound corrected by the correcting unit from the output unit;

connecting an earpiece to a connector;

outputting the sound corrected by the correcting unit from the earpiece, when the earpiece is connected to the connector; and changing a correction parameter for correcting the quality of sound, when an output destination of the sound thus corrected is switched between the output unit and the earpiece, wherein, in a case in which the output control unit switches the output destination of the sound thus corrected from the earpiece to the output unit, when a correction level corresponding to the correction parameter exceeds a predetermined value, the changing unit changes the correction level to a predetermined level.

* * * * *